United States Patent [19]

Corsette

[11] E Patent Number: Re. 33,235

[45] Reissued Date of Patent: Jun. 19, 1990

[54] LIQUID DISPENSING PUMP

[76] Inventor: Douglas F. Corsette, 6559 Firebrand St., Los Angeles, Calif. 90045

[21] Appl. No.: 258,878

[22] Filed: Oct. 17, 1988

Related U.S. Patent Documents

Reissue of:

[64] Patent No.: 4,618,077
Issued: Oct. 21, 1986
Appl. No.: 587,070
Filed: Mar. 7, 1984

[51] Int. Cl.[5] ..... B67D 5/40

[52] U.S. Cl. ..... 222/383; 222/340; 239/333

[58] Field of Search ..... 222/383, 384, 340, 380, 222/321, 335; 239/333, 322

[56] References Cited

U.S. PATENT DOCUMENTS

| | | | |
|---|---|---|---|
| 3,527,551 | 9/1970 | Kutik et al. | 222/384 |
| 4,046,292 | 9/1977 | Corsette | 222/383 |
| 4,050,613 | 9/1977 | Corsette | 222/383 |
| 4,072,252 | 2/1978 | Steyns et al. | 222/380 |
| 4,191,313 | 3/1980 | Blake et al. | 222/341 |
| 4,225,060 | 9/1980 | Kutik et al. | 222/189 |
| 4,402,432 | 9/1983 | Corsette | 222/383 |
| 4,458,832 | 7/1984 | Corsette | 222/384 |
| 4,489,861 | 12/1984 | Saito et al. | 222/384 |
| 4,591,077 | 5/1986 | Corsette | 222/383 |

FOREIGN PATENT DOCUMENTS

| | | | |
|---|---|---|---|
| 0020840 | 1/1981 | European Pat. Off. . | |
| 55-02516 | 11/1980 | Japan | 222/383 |
| 8004831 | 11/1980 | Netherlands | 239/333 |

*Primary Examiner*—Joseph J. Rolla
*Assistant Examiner*—Kenneth Noland
*Attorney, Agent, or Firm*—Watson, Cole, Grindle & Watson

[57] ABSTRACT

A liquid dispensing pump in the form of a trigger sprayer includes a thimble-shaped valving element containing inlet and outlet valves, and located within a cylindrical portion of the pump body. In one embodiment, a pressure accumulation chamber is defined between the pump body and the valving element, and a pump piston operates within the valving element and defines therewith a pump chamber in open communication with the accumulation chamber via spaced, flexible and extendable straps which interconnect the inlet and outlet valves for permitting a portion of the valving element to move axially into a discharge valve opening position. Vent valving is effected by either the pump piston or the valving element during inward reciprocation movement of the piston. In another embodiment, the sprayer is converted into a throttle pump by the provision of a pump piston which operates within the cylindrical portion of the pump body.

30 Claims, 2 Drawing Sheets

LIQUID DISPENSING PUMP

Matter enclosed in heavy brackets [ ] appears in the original patent but forms no part of this reissue specification; matter printed in italics indicates the additions made by reissue.

BACKGROUND OF THE INVENTION

This invention relates generally to a liquid dispensing pump in the form of a trigger operated sprayer, and relates to my earlier U.S. Pat. No. 4,046,292.

The pump disclosed by such patent is of the pressure-accumulating type including a unitary member having an inlet check valve, an outlet check valve acting in response to an increase in pressure within an accumulation chamber, and a pump cylinder carried by the outlet valve. The inlet port is located coaxially of the pump body, and the outlet port opens radially from the accumulation chamber. A pump piston reciprocates within the pump cylinder and defines therewith a pump chamber in open communication with the accumulation chamber. Thus, upon an increase in pressure within the accumulation chamber, a dripless product discharge is attained by an automatic low pressure cut off at the end of each piston stroke. Also, a container vent valve is carried by the outlet valve for controlling a vent passage located in the pump body.

SUMMARY OF THE INVENTION

As an alternative construction over the aforementioned patent, the pump according to the invention includes a thimble-shaped element which includes inlet and outlet check valves and defines a pump cylinder in which a piston operates, the thimble-shaped element being of a simple construction which is simple to manufacture and assemble, and which renders the pump easy to operate while at the same time effects a dripless product discharge.

A container vent is located in the pump body and may be controlled by a flexible lip seal on the piston when it engages means provided on the pump body for opening a vent passage in the inward movement of the piston. Otherwise, the container vent may be controlled by a flange provided on the piston which uncovers the vent in the inward movement the piston. Alternatively, the container vent may be controlled by the thimble-shaped element itself, a portion of which moves axially during an open position of the outlet into a vent opening position.

Also, the pump body according to the invention includes inlet and outlet passages respectively terminating in inlet and outlet ports respectively located at one axial end of a cylindrical pressure accumulation chamber and opening radially outwardly from such chamber, the axis of the thimble shaped member extending at an angle between such passages, or extending parallel to the outlet passage.

The piston operating within the pump cylinder defines therewith a pump chamber in open communication with the pressure accumulation chamber via openings defining flexible extendable-shaped straps located in an end wall of the thimble-shaped element, such end wall preferably being of conical configuration when the axis of the element extends at an angle to the inlet and outlet passages, and being flat when the axis of the element extends parallel to the outlet passage.

In another embodiment according to the invention, the pressure accumulation chamber is omitted, and the pump chamber is defined between the piston and a cylindrical portion of the pump body. The outlet valve is defined by an annular flexible lip seal on the cup-shaped member which flexes away from such cylindrical pump body portion in response to an increase in pressure within the pump chamber. And, the container vent may be controlled by an annular flange on the piston which either uncovers the vent or establishes a container vent passage with the pump body upon inward movement of the piston.

In addition, the invention makes provision for quick opening and slow opening outlet valves.

DETAILED DESCRIPTION OF THE INVENTION

Figure 1:
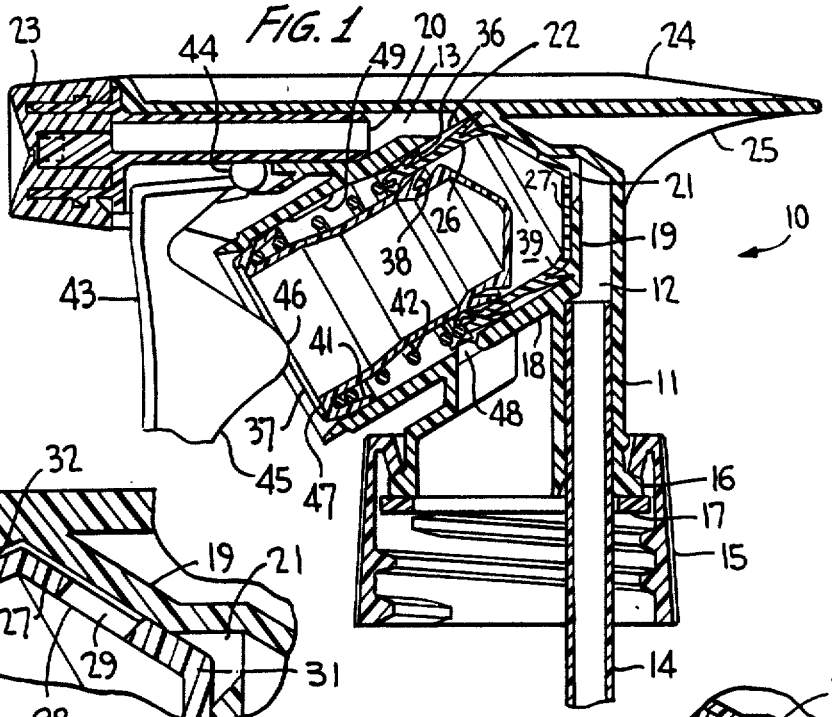
FIG. 1 is a vertical sectional view of a dispensing pump according to one embodiment of the invention.

Turning now to the drawings wherein like reference characters refer to like and corresponding parts throughout the several views, a liquid dispensing in the form of a trigger operated sprayer is, according to one embodiment of the invention, generally designated 10 in FIG. 1 which includes a pump body 11 defining an inlet passage 12 and an outlet passage 13. A conventional dip tube 14 is received within the inlet passage and extends into a container (not shown) of product to be dispensing in a manner well known in the art. A container cap 15, having internal threads or other container securement means, engages an annular lip 16 of a circular section of the pump body for mounting the sprayer onto the neck of the container, and if desired a seal ring 17 may be disposed between the lower end of pump body and the upper end of the container neck.

The pump body further includes a cylinder 18 having a conical end wall 19 containing an inlet port 21 in which the inlet passage terminates. The cylinder axis lies between and extends at an angle to inlet and outlet passages 12 and 13. And, the outlet passage extends from an outlet port 22, located in wall 18, through a nozzle plug 20 fitted within the pump body, and terminates in a discharge orifice located in a nozzle cap 23 in engagement with the plug. Also, the pump body is provided with an integral shroud 24, which may otherwise be made separately and assembled in place and having a contoured wall 25 shaped to fit against the hand when the trigger sprayer is grasped by the operator.

Figure 2:
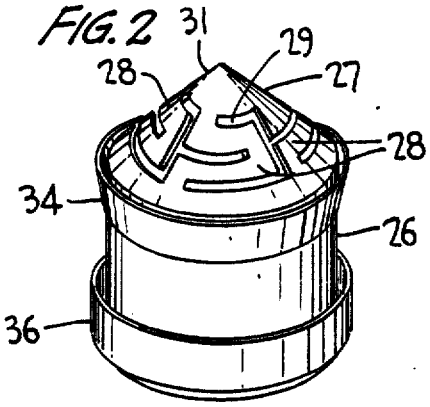
FIG. 2 is a perspective view of the thimble-shaped member according to FIG. 1.

A unitary, thimble-shaped valving element 26, shown in more detail in FIG. 2, is disposed within cylinder 18 and has at one end thereof a conical wall 27 substantially corresponding in shape to end wall 19. Wall 27 includes a plurality of flexible and extendably-shaped straps 28 which extend from adjacent the tip to the base and are defined by openings 29 which may be of mazelike configuration. Thus, the tip of wall 27 is capable of axially shifting relative to the remainder of elements 26, and vice-versa. And, rather than openings 29 of the configuration shown, S-shaped, or the like, openings may be provided to facilitate such relative axial shifting movements, without departing from the invention.

The tip of conical wall 27 defines an inlet check valve 31 for controlling inlet port 21, and straps 28 are neutral from a pressure standpoint, a pressure accumulation chamber 32, shown in detail view 1A, is defined between the inner end of element 26 and the confronting surfaces of the pump body. Thus, the inlet port is located at one axial end of this chamber and the outlet port opens radially from such chamber.

A ring 33 extends from wall 19 toward element 26, and an annular flange 34 on element 26 adjacent wall 27 defines a discharge valve which seats against ring 33 in a discharge closing position, the flange defining an annular groove 35 with the body of element 26 so as to effectively form an extension of accumulation chamber 32.

An annular flexible lip seal 36 on element 26 is located adjacent the free end thereof, although may lie further inwardly toward flange 34 if desired, for slideably engaging the inner surface of cylinder 18 in a fluid tight manner.

A pump piston in the form of a thimble or cup-shaped element 37 extends into element 26 and has a flexible, circular skirt 38 adapted for sliding along the inner surface of the valving element in fluid tight engagement therewith. The piston thus defines a variable volume pump chamber 39 with element 26, and the pump chamber is in open communication with accumulation chamber 32 via openings 29. As shown, the piston head is complementarily contoured to the opposing conical wall 27 to permit the piston to bottom out within pump chambers 39 during pumping. Thus, any air within the pump chamber is effectively evacuated during priming. Moreover, an annular, flexible skirt or lip seal 41 on piston element 37 surrounds the open end thereof and is slideable along the inner surface of cylinder 18 in a fluid tight manner to define an annular chamber therewith, as shown. Thus, cylinder 18 and element 26 define cylinder means having a counterbore engaged by lip seal 41 of the piston and a bore engaged by skirt 38 thereof. A return spring 42 encircles piston element 37 and extends between flange 41 and the outer rim of element 26 for normally urging the outlet valve toward its closing position. Cooperating snap beads on skirt 41 and the inner surface of cylinder 18 may be provided for retaining the piston within the pump body.

Sprayer 10 further includes a trigger actuator in the form of a lever 43 having a trunnion 44 to facilitate mounting the lever for pivotal movement about the axis thereof on the pump body. The lever has a pair of spaced actuator flanges 45 (only one being shown in FIG. 1) spaced apart at outer ends 46 thereof a sufficient distance for bearing against outer circular rim 47 of the piston element. Alternatively, a rod-like member may extend between the trigger actuator and the end wall of the piston, the rod-like member may be integral with either the piston or the trigger member, or it may be separate from both.

A container vent 48 is located in the wall of cylinder 18, and at least one axially disposed rib 49 is provided on the inner surface of cylinder 18 for flexing skirt 41 radially inwardly when in contact therewith during a piston inward position so as to define a passage from atmosphere to the inside of the container through vent 48 through which the dispensed product is replaced with air during the dispensing operation.

As shown, vent 48 is inwardly spaced from lip seal 41 in both non-pumping and pumping positions of the piston. And, in the FIG. 1 arrangement, vent 48 inherently functions as a sump drain port which establishes communication with the aforementioned annular chamber and the interior of the container. Thus, with such arrangement, any leakage of product from pump chamber 39 around piston skirt 38 is purged from the annular chamber into the container through port 48, any leakage of product from the container through port 48 and outwardly of cylinder 18 is prevented, and any abrasion of piston skirt 38 or lip seal 41, during pumping or during assembly of piston element 37, is avoided.

In operation, after the pump chamber is primed with product to be dispensed, the piston is inwardly reciprocated upon manual actuation of the trigger lever against the force of spring 42 and the enclosed fluid to thereby increase the pressure within the pump chamber which maintains inlet valve 31 closed during the compressing stroke. As the compression force increases, there will manifestly be a progressively increasing fluid pressure within accumulation chamber 32 until such pressure creates a force on the outer end surfaces of valving member 26 which extend from the pump chamber diameter outwardly to flange 34 sufficient to overcome the opposing force of the spring. This will result in movement of flange 34 in an axial direction away from ring 33 to thereby open the discharge passage whereby the contents of chamber 39 will be discharged under pressure through discharge passage 13. Such discharge will continue as long as the pressure within the pump chamber is sufficient to overcome the force of the return spring. However, when the pressure within the accumulation chamber is reduced, either by reduced actuating force on the piston or through approach of the piston to the end of its pressure stroke, so as to produce insufficient force to overcome the return spring, the spring will act to return the outlet valve immediately to its closed position, thereby affording an abrupt sharp cutoff of the discharge to minimize dripping of product from the discharge nozzle.

Figure 1A:
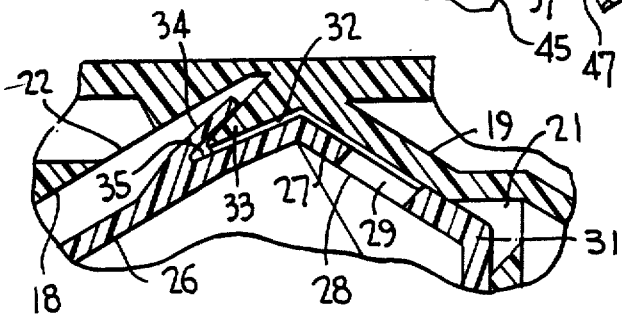
FIGS. 1A and 1B are sectional views similar to FIG. 1 showing details of quick opening and slow opening discharge valves, respectively.

Since the discharge valve makes tangential contact (FIG. 1A) with ring 33, and the outer surface of the discharge valve is radially inwardly spaced from the wall cylinder 18, a quick acting discharge is effected as soon as this tangential contact is broken.

Figure 1B:
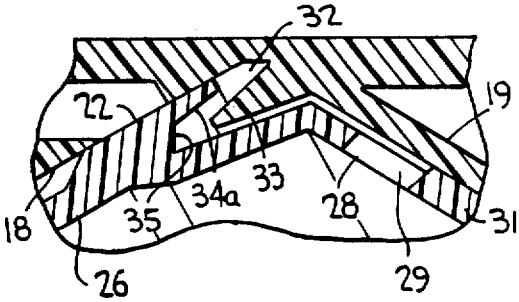

On the other hand, a modification is shown in FIG. 1B wherein discharge valve 34 is out of contact with ring 33 in the discharge closing position and is instead in fluid tight engagement with the wall of cylinder 18 for covering the outlet as shown. Thus, the free end of the discharge valve slides along the wall of cylinder 18 at a larger diameter than flange 33 until the outlet port is uncovered during the opening of the discharge, so as to effect a slow opening discharge. The aforedescribed quick opening and slow opening discharging is likewise included in my dispensing pump disclosed in my U.S. Pat. No. 4,402,432.

On the succeeding outward stroke of the piston under actuation of the return spring, after the closing of the discharge as aforedescribed, the discharge valve will remain seated to prevent back flow of liquid through the outlet onto the accumulation chamber, while the resulting reduced pressure within chambers 32 and 39 will open inlet valve 31 against the cushion of strips 28, thereby enabling a charge of flowable product from the container to be drawn upwardly through the dip tube and the inlet port into the intercommunicating accumulation pump chambers.

Discharge valve 34 will remain closed throughout the entire outward stroke of the piston and, at or near the end of such stroke, the inlet valve will be reseated over the inlet port, under the elastic memory action of straps 28 tending to retain the conicity of wall 27, in preparation for the next ensuing compression stroke of the piston.

Reciprocation of the pump piston continues for as long as is necessary to dispense the desired amount of product from the container to which the sprayer is applied, following which the discharge valve will be automatically seated and sealed by the action of its return spring, while the inlet valve is urged immediately to its seated position and retained in such position over the inlet port, by the action of straps 28.

Throughout the pumping and dispensing action as aforedescribed, vent valve 41 will automatically be opened simultaneously with inward displacement of the piston flange to rib 49, with the result that each time a charge of flowable product is delivered through the outlet port to the atmosphere, a vent passage is in open communication with the atmosphere through the clearance space between the vent valve and the inner wall of cylinder 18 as produced by rib 49. Thus, automatic air may be drawn into the container through vent 48 as necessary to replenish dispensed product.

Figure 3:
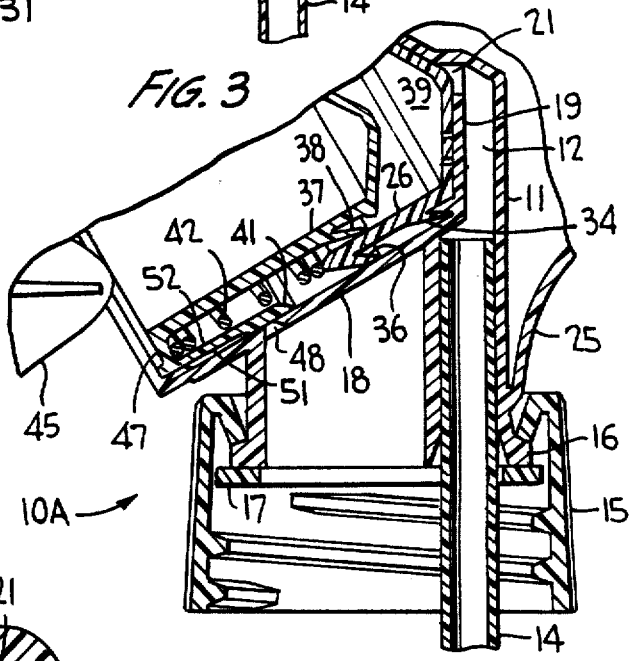
FIGS. 3, 4 and 5 are sectional views similar to FIG. 1 of other embodiments according to the invention, with portions only of the pump being shown.

Another embodiment of the liquid dispensing pump or trigger sprayer of the invention is generally indicated 10A in FIG. 3 and is constructed in essentially the same manner as pump 10 except for the venting feature. Here, an annular vent seal 41 forming a vent valve is located sufficiently inwardly from rim 47 of the piston so as to cover vent opening 48 at the end of the piston suction stroke. As in FIG. 1, snap beads are provided on the piston and the inner wall of cylinder 18 for retaining the piston within the cylinder, except that in FIG. 3 a vent passage 51 is defined outwardly of the vent valve between skirt 52 on which the vent valve is located and the inner surface of cylinder 18. Thus, when the vent valve uncovers vent opening 48 in the discharge opening position, atmospheric air is drawn into the container through the open vent passage and the uncovered vent opening.

Figure 4:
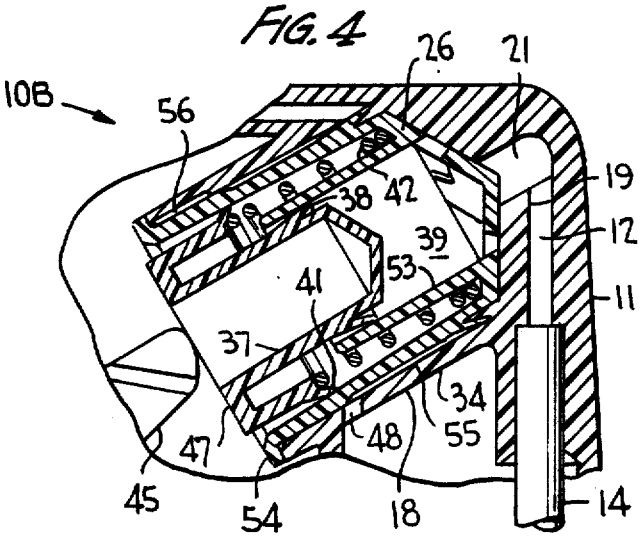

In FIG. 4, a liquid dispensing pump generally designated 10B is similarly constructed as the aforedescribed embodiments except for the [valving] *venting* feature. In addition, valving element 26 has an inner concentric sleeve 53 defining an annular space with the cylindrical wall of the valving element for the reception of the return spring and having an inner cylindrical wall along which piston skirt 38 slidingly and sealingly engages. And, valving element 26 is extended for engagement by means of its annular flange 54 with the outer end of cylinder 18 in the discharge closing position. This is a fluid tight engagement since valving element 26 functions as a vent valve, in addition to an intake and discharge valve, in this embodiment. And, skirt 41 of the piston slides along the inner surface of the valving element in a fluid tight manner during the pumping operation.

To facilitate venting, element 26 has a smaller outer diameter relative to the inner diameter of cylinder 18 between the vent valve and discharge valve 34 so as to define an annulus 55. And, at least one axially extending groove 56 is provided in the wall of cylinder 18 between this annulus and flange 54. Thus, in the discharge opening position, valve 34 shifts outwardly as in the other embodiments described above as does the outer annular wall of the valving element to thereby cause flange 54 to shift outwardly to define an open vent passage from the atmosphere to the container via open groove 56, annular 55 and the container vent which is now uncovered.

Figure 5:
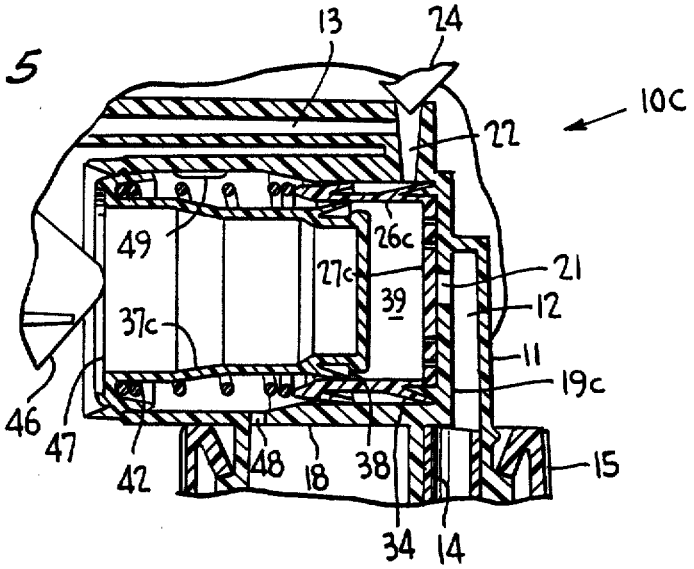

A still further embodiment of the invention is shown in FIG. 5 as a liquid dispensing pump 10C which is essentially the same as FIG. 1 except that the piston and valving member axes are parallel to the discharge passage rather than extending at an angle between the inlet and discharge passages as before. And, end wall 19c of the pump body, end wall 27c of valving element 26c, and the piston head of piston 37c are all flat and substantially parallel to one another, as shown, so as to lie perpendicular to the concentric axes of the cylinder, and the valving and piston elements. Otherwise, the operation of the pump is essentially the same as that described in detail with reference to FIG. 1. While only a section of this dispensing pump 10C is shown, it should be noted that a portion of shroud 24 is sealed against the upper end of the passage which terminates in outlet port 22 so as to avoid leakage.

Figure 6:
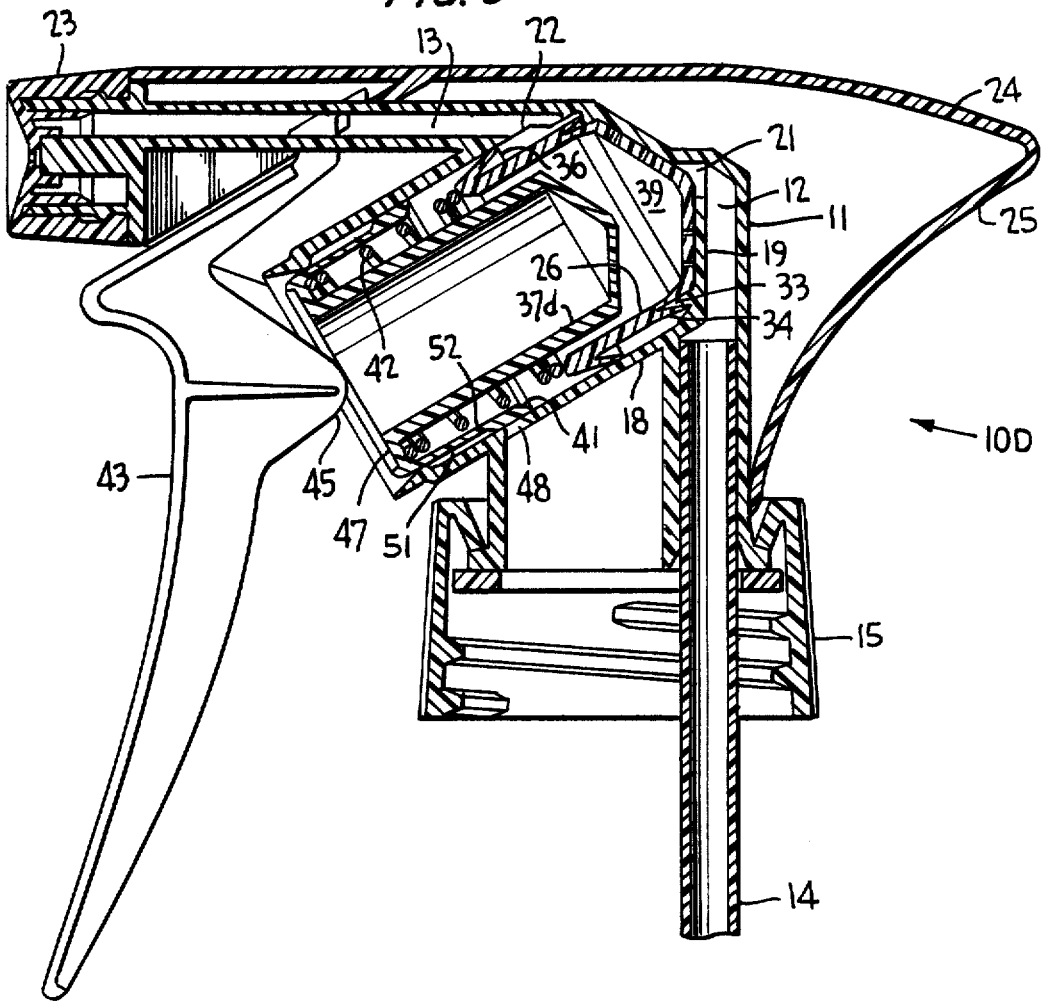
FIG. 6 is a vertical sectional view of yet another dispensing pump according to the invention.

Still another embodiment of the trigger sprayer according to the invention is generally designated 10D in FIG. 6 which is similar to sprayer 10A of FIG. 3 regarding the venting feature. However, unlike the foregoing embodiments, trigger sprayer 10D has a piston 37d with no skirt or lip seal 38 whereupon the volume of pump chamber 39 is enlarged as product additionally fills the annular space between cylinder 18 and the piston. And, although valving element 26 is the same as that of the sprayer 10A valve unit, only the inlet valve portion 31 thereof functions the same as in FIG. 3. Otherwise, valving element 26 of FIG. 6 has no accumulator function or effect. Flange 34 of the valving element seals against ring 33 under the force of spring 42 but cannot be dislodged from this sealing position contrary to the aforedescribed sprayers. Since the piston operates within cylinder 18 which functions as a pump cylinder, rather than within the valving element which functions as a pump cylinder in the foregoing embodiments, lip seal 36 of the valving element functions as a discharge valve in the FIG. 6 embodiment in response to an increase in hydraulic pressure within the pump chamber during the compression stroke so as to flex radially inwardly away from the inner wall of cylinder 18 for opening the discharge, while remaining closed at all other times. Thus, by simply removing piston skirt 38, sprayer 10A of the pressure accumulating type is converted into a sprayer 10D of the throttling type in which lip seal 36 functions as a circular bunsen valve in the discharge path which opens from hydraulic pressure within the pumping bore during the piston compression stroke, and remains closed during the piston suction stroke. All other parts of the sprayer are thus interchangeable with the parts of sprayer 10A, although sprayer 10D has approximately double the spraying capacity compared to the other sprayers described above. And, trigger lever 43 is preferably longer to provide a high strength for effecting an increased leverage and stroke.

Although the venting feature of sprayer 10D is shown similar to that of sprayer 10A, the venting feature of the FIG. 1 sprayer could be adopted without departing from the invention. And, if desired, the cylinder, valving element and piston of FIG. 6 could lie parallel to the discharge passage as in FIG. 5.

Each of the trigger sprayer embodiments of the invention has shipping seals for the vent passage as well as for the inlet and discharge ports which are automatically self-closing when the pump is at rest and between dispensing strokes. And, each of the sprayers is adapted for fabrication from a minimum number of parts using a minimum number of assembly operations. As noted above, shroud 24 may be integrally fabricated with the remainder of the pump body. Also, a nozzle plug 20 can be simply inserted in place together with the trigger lever, and nozzle cap 23 is snapped or threaded into place. Dip tube 14 is conventional, and the piston, valving element and return spring are capable of being assembled as a sub-assembly and inserted within the bore of cylinder 18. And, the cylinder connecting portion of the pump body and the internally threaded closure cap may be permanently attached together as in the manner disclosed in my prior U.S. Pat. No. 4,361,256.

The quick opening and slow opening discharge valves described with reference to FIG. 1 apply equally as well to the FIGS. 3, 4 and 5 embodiments. And, straps 28, which interconnect the inlet valve at the tip of wall 27 of the valving member and the base of this wall, shown in detail in FIG. 2, are similarly arranged in the valving elements of the FIGS. 3, 4 and 6 embodiments, as well as in the FIG. 5 embodiment except that wall 27c is flat rather than conical therein. A central portion of this wall 27c nevertheless functions as an inlet valve. And, straps 28 are neutral from a pressure standpoint and flange 34, together with annular groove 35, define an accumulation chamber of appreciably larger diameter than the pump chamber such that, as the compression force of the piston continues, there will be a progressively increasing fluid pressure within the accumulation chamber until such pressure creates an outward force in an axial direction causing the side wall of the valving element to shift outwardly relative to inlet valve 31 which remains seated during the influence of increased pressure within the pump chamber and against the inlet valve. The straps permit wall 27 or 27c to flex and to resume its initial position during the discharge valve opening and closing operations. Although a plurality of such straps are illustrated, it should be pointed out that as few as two straps may be provided without departing from the invention. Moreover, the straps may be shaped other than shown, so long as they are extendable between tip and base of wall 27 to facilitate relative axial shifting during the pumping operation as in the manner aforedescribed.

And, by simply providing a piston member without a piston skirt 38, a sprayer of the pressure accumulating type can be easily converted into a sprayer of the throttle type having an increased pump capacity.

Obviously, many other modifications and variations of the present invention are made possible in the light of the above teachings. It is therefore to be understood that within the scope of the appended claims the invention may be practiced otherwise than as specifically described.

What is claimed is:

1. In a liquid dispensing pump which includes: a pump body defining a pressure accumulation chamber having an inlet port at one axial end thereof for communication with a source of flowable product to be dispensed, and an outlet port opening radially from said chamber; a unitary element including an inlet check valve controlling said inlet port, further including an outlet valve disposed for axial movement in said chamber from a closed position adjacent said one axial end in which it blocks communication between said ports to an open position remote from said one axial end in which it establishes communication between said ports, and still further including a pump cylinder defining a pump lying coaxially with said accumulation chamber and in open communication therewith; a pump piston reciprocable in said cylinder independently of the movement of said outlet valve; resilient means normally urging said outlet valve toward its closed position; and means for manually reciprocating said piston; the improvement wherein:

said unitary element comprises a thimble-shaped element having an inner end containing said valves;

said inner end of said element including a wall connected to said pump cylinder and defining an inner end of said pump chamber, said wall containing said inlet valve and a plurality of straps lying between said valves and defined by openings establishing the open communication between said chambers, said straps being flexible and extendably-shaped to facilitate relative axial shifting of said valves during a pumping operation;

said head of said piston and the wall which opposes said head are complementarily contoured to facilitate effective priming as any air within said pump chamber is evacuated during pumping.

2. The liquid dispensing pump according to claim 1, wherein said resilient means comprises a coil spring encircling said piston and compressed axially between said piston and said unitary element.

3. The liquid dispensing pump according to claim 1, wherein said pump body includes mutually perpendicular inlet and outlet passages respectively terminating in said inlet and outlet ports, the axis of said unitary element and said piston extending at an angle between said passages.

4. The liquid dispensing pump according to claim 1, wherein said pump body includes mutually perpendicular inlet and outlet passages respectively terminating in said inlet and outlet ports, the axis of said unitary element and said piston extending laterally of said inlet passage.

5. The liquid dispensing pump according to claim 1, wherein said means for manually reciprocating said piston comprises a finger operated trigger element mounted on said pump body in engagement with said piston.

6. The liquid dispensing pump according to claim 1, wherein said pump body has a cylindrical wall including a vent opening to establish communication between a container to which the pump is applied and the atmosphere, said piston having a vent seal in engagement with said cylindrical wall for closing said vent opening upon outward reciprocation of said piston, and means at said cylindrical wall for disengaging said vent seal therefrom for opening said vent opening, upon an inward reciprocation of said piston within said cylinder.

7. The liquid dispensing pump according to claim 1, wherein said pump body has a cylindrical wall having a vent passage to establish communication between a container to which the pump is applied and the atmosphere, said unitary element having a peripheral wall surrounding said pump cylinder and including a vent valve for closing said vent passage in the closed position of said outlet valve, and for opening said vent passage in the open position of said outlet valve.

8. The liquid dispensing pump according to claim 1, wherein said pressure accumulation chamber is defined by said inner end of said element and said axial end, said pump body including an annular ring at said axial end, and said unitary element having an annular groove defining said outlet valve in the form of an annular valve flange, said unitary element being in sealing engagement with said pump body outwardly of said outlet port, and said valve flange engaging only said ring in the closed position of said outlet flange so as to define a quick acting outlet valve.

9. The liquid dispensing pump according to claim 1, wherein said pressure accumulation chamber is defined by said inner end of said element and said axial end, said pump body including an annular ring at said axial end, and said unitary element having an annular groove defining said outlet valve in the form of an annular valve flange, said pump body having a cylindrical wall containing said outlet port, said valve flange having a terminal end engaging said cylindrical wall inwardly of said outlet port in the closed position of said outlet valve so as to define a slow acting outlet valve.

10. A liquid dispensing pump, comprising a pump body having a pump cylinder defining a pump chamber, said cylinder having an end wall containing a coaxial inlet port for communication with a source of flowable product to be dispensed, and said cylinder having a side wall containing an outlet port opening radially from said chamber, a pump piston reciprocable in said cylinder, a thimble-shaped valving element located in said cylinder and having an end wall defining an inlet check valve controlling said inlet port, said end wall having openings surrounding said inlet check valve through which product is admitted into said chamber from said inlet port, said valving element further having an annular resiliently flexible lip seal defining an outlet check valve, said lip seal being in engagement with said side wall of said pump cylinder in an outlet closing position and being flexible radially inwardly away from said side wall in an outlet opening position in response to an increase in pressure within said pump chamber, resilient means extending between said piston and said valving element, means for manually reciprocating said piston against the force of said resilient means, said pump body having acylindrical wall containing a vent opening, said piston having an annular vent seal in engagement with said cylindrical wall for closing said vent opening, and means at said cylindrical wall for disengaging said vent seal from said cylindrical wall to thereby establish in a pumping position a vent passage for venting the container through said vent opening.

11. The pump according to claim 10, wherein said resilient means comprises a coil spring encircling said piston and compressed axially between said piston and said valving element.

12. The pump according to claim 10, wherein said pump body includes mutually perpendicular inlet and outlet passages respectively terminating in said inlet and outlet ports, the axis of said valving element and said piston extending at an angle between said passages.

13. The pump according to claim 10, wherein said pump body includes mutually perpendicular inlet and outlet passages respectively terminating in said inlet and outlet ports, the axis of said valving element and said piston extending laterally of said inlet passage.

14. The liquid dispensing pump according to claim 11, wherein said means for manually reciprocating said piston comprises a finger operated trigger element mounted on said pump body in engagement with said piston.

15. The pump according to claim 10, wherein said means at said cylindrical wall comprises an axial rib.

16. A liquid dispensing pump, comprising a pump body, a separate closure cap engaged with said pump body for mounting said pump body on a container of flowable product to be dispensed, said pump body including outwardly opening cylinder means having a bore of predetermined diameter and a counterbore of relative greater diameter, said cylinder means being disposed at an angle to the central axis of said closure cap, a pump piston reciprocable in said cylinder means, said piston having piston seal means in sliding sealing engagement with the wall of said bore and defining together therewith a variable volume pump chamber, said pump body having inlet and outlet means for delivering product into and out of said pump chamber, means for manually reciprocating said piston, said cylinder means including a vent port establishing communication between the interior of said counterbore and the interior of the container, said piston having an annular seal means in sliding sealing engagement with the wall of said counterbore for sealing off said vent port from the atmosphere in a non-pumping position, and means at said wall of said counterbore for disengaging said annular seal means from said wall of said counterbore to thereby establish in a pumping position a vent passage for venting the container through said vent port, said annular seal means being located outwardly of said disengaging means in said non-pumping position.

17. The pump according to claim 16, wherein said seal means comprises an annular, flexible, resilient lip seal, and said disengaging means comprises an axial rib for flexing said lip seal radially inwardly of said counterbore for establishing said vent passage.

18. The pump according to claim 16, wherein said cylinder means includes a thimble-shaped element defining said bore, said pump body defining a pressure accumulation chamber with said element in open communication with said pump chamber, said element having an inner end containing inlet and outlet check valves for controlling said inlet and outlet means.

19. The pump according to claim 18, wherein said inner end of said element includes a wall defining a plurality of straps lying between said valves and defined by openings establishing the open communication between said chambers, said straps being flexible and extendably-shaped to facilitate relative axial shifting of said valves in said pumping position.

20. A liquid dispensing pump, comprising a pump body, a separate closure cap engaged with said pump body for mounting said pump body on a container of flowable product to be dispensed, said pump body including outwardly opening cylinder means having a bore of predetermined diameter and a counterbore of relative greater diameter, said cylinder means being disposed at an angle to the central axis of said closure cap, a pump piston reciprocable in said cylinder means, said piston being in sliding sealing engagement with the wall of said bore and defining together therewith a variable volume pump chamber, said pump body having inlet and outlet means for delivering product into and out of said pump chamber, means for manually reciprocating said piston, said piston having an annular lip seal in sliding sealing engagement with the wall of said counterbore for defining an annular chamber therewith, said cylinder means including a sump drain port establishing communication between said annular chamber and the interior of the container, said port being inwardly spaced from said lip seal in non-pumping and pumping positions of said piston, whereby any leakage of product from said pump chamber around said piston is purged from said annular chamber into the container through said sump drain port, any leakage of product is prevented from the container through said port and outwardly of said cylinder means, and any abrasion of said piston or said lip seal by the wall of said port, during pumping or assembly of the piston, is avoided.

21. The pump according to claim 20, wherein said cylinder means includes a thimble-shaped element defining said bore, said pump body defining a pressure accumulation chamber with said element in open communication with said pump chamber, said element having an inner end containing inlet and outlet check valves for controlling said inlet and outlet means.

22. The pump according to claim 21, wherein said inner end of said element includes a wall defining a plurality of straps lying between said valves and defined by openings establishing the open communication between said chambers, said straps being flexible and extendably-shaped to facilitate relative axial shifting of said valves in said pumping position.

23. A liquid dispensing pump, comprising a pump body, a separate closure cap engaged with said pump body for mounting said pump body on a container of flowable product to be dispensed, outwardly opening cylinder means in said pump body, said cylinder means being disposed at an angle to the central axis of said closure cap, a pump piston reciprocable in said cylinder means and defining together therewith a variable volume pump chamber, said pump body having inlet and outlet means for delivering product into and out of said pump chamber, means for manually reciprocating said piston, said cylinder means including a cylindrical wall, a container vent port located in said wall at a position lying outwardly of said pump chamber, a vent chamber located between said piston and said wall in communication with said port, annular seal means on said piston spaced outwardly of said vent port in both pumping and non-pumping positions of said piston for sealingly engaging said wall at the end of outward reciprocation of said piston for sealing said vent chamber closed to the atmosphere, and means at said wall for opening said vent chamber to the atmosphere during inward reciprocation of said piston, said means at said wall being located between said vent port and said seal means when in engagement with said wall.

24. The pump according to claim 23, wherein said seal means comprises an annular, flexible, resilient lip seal, and said means at said wall comprising an axial rib for deforming said lip seal radially inwardly of said wall for opening said vent chamber.

25. A liquid dispensing pump, comprising a pump body, a separate closure cap engaged with said pump body for mounting said pump body on a container of flowable product to be dispensed, outwardly opening cylinder means in said pump body, said cylinder means being disposed at an angle to the central axis of said closure cap, a pump piston reciprocable in said cylinder means and defining together therewith a variable volume pump chamber, said pump body having inlet and outlet means for delivering product into and out of said pump chamber, means for manually reciprocating said piston, said cylinder means including a cylindrical wall, a sump drain port located in said wall at a position lying outwardly of said pump chamber, said piston having an annular lip seal defining an annular chamber with said wall and being spaced outwardly of said port in both pumping and non-pumping positions of said piston, said annular chamber being in communication with said port, said lip seal sealingly engaging said wall at the end of outward reciprocation of said piston for sealing said chamber closed to the atmosphere, whereby any leakage of product from said pump chamber around said piston is purged from said annular chamber into the container through said port, any leakage of product is prevented from the container through said port and outwardly of said cyinder means, and any abrasion of said piston or said lip seal by the wall of said port, during pumping or assembly of said piston, is avoided.

26. The pump according to claim 25, wherein means are provided at said cylindrical wall for opening said annular chamber to the atmosphere during inward reciprocation of said piston, said means at said wall being located between said port and said lip when in engagement with said cylindrical wall.

27. The pump according to claim 25, wherein said means at said wall comprises an axial rib for deforming said lip seal radially inwardly of said cylindrical wall for opening said annular chamber.

*28. A manually actuated dispensing pump comprising a pump body for mounting with a closure cap at the upper end of a container for fluent product, the pump body comprising a pump cylinder open at its outer end to atmosphere and within which is provided at its inner end region, a pump chamber for a manually reciprocable piston, the cylinder having in its lower region a vent port positioned outwardly of the chamber and in permanent open communication with the interior of the container, wherein the pump further comprises a valving element which is axially reciprocable within the pump cylinder in response to the balance between pump pressure and an opposing spring force and in which said piston is received to define the pump chamber, the valving element and cylinder defining between them a pressure accumulation chamber in open communication with the pump chamber, the valving element engaging the inner surface of the cylinder and having a flange engaging the outer end of the cylinder in an at-rest position of the piston, and the cylinder having adjacent its outer end, in its inner surface, a vent passage, and the valving element having in its outer surface vent means, outward axial movement of the valving element during pumping action to disengage the flange from the pump cylinder and to permit the free flow of air between atmosphere and the interior of the container through the vent passage, the vent means and the vent port.*

*29. A pump according to claim 1, wherein said vent passage comprises a groove.*

*30. A pump according to claim 1 or 2, wherein said vent means comprises an annulus.*

* * * * *